United States Patent
Bliss (10) Patent No.: US 9,593,795 B2
(45) Date of Patent: Mar. 14, 2017

(54) FUEL HEAD ASSEMBLY WITH REPLACEABLE WEAR COMPONENTS

(75) Inventor: Theron Jamie Bliss, Enfield, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 13/554,124

(22) Filed: Jul. 20, 2012

(65) Prior Publication Data
US 2013/0181072 A1 Jul. 18, 2013

Related U.S. Application Data

(60) Provisional application No. 61/585,804, filed on Jan. 12, 2012.

(51) Int. Cl.
| | |
|---|---|
| *F16L 57/06* | (2006.01) |
| *F23K 3/02* | (2006.01) |
| *F23D 1/00* | (2006.01) |
| *F16L 45/00* | (2006.01) |

(52) U.S. Cl.
CPC .............. *F16L 57/06* (2013.01); *F16L 45/00* (2013.01); *F23D 1/00* (2013.01); *F23D 2201/20* (2013.01); *F23D 2201/30* (2013.01); *F23K 3/02* (2013.01); *F23K 2203/006* (2013.01); *F23K 2203/008* (2013.01); *F23K 2203/101* (2013.01); *F23K 2203/201* (2013.01)

(58) Field of Classification Search
CPC .... F23D 1/00; F23D 2201/20; F23D 2201/30; F23K 3/02; F23K 2203/008; F23K 2203/10; F23K 2203/101; F23K 2203/201; F23K 2203/006; B65G 53/523; F15D 1/04

USPC .......... 110/104 B, 260, 261, 263, 264, 265; 285/179; 403/205

See application file for complete search history.

(56) References Cited

U.S. PATENT DOCUMENTS

| | | |
|---|---|---|
| 3,055,416 A | 9/1962 | Marshall |
| 3,955,416 A | 5/1976 | Waiwood |
| 4,027,605 A | 6/1977 | Legille |
| 4,130,300 A | 12/1978 | Sheridan |

(Continued)

FOREIGN PATENT DOCUMENTS

| | | |
|---|---|---|
| CN | 2051324 U | 1/1990 |
| CN | 101055076 A | 10/2007 |

(Continued)

OTHER PUBLICATIONS

International Search Report and Written Opinion issued in connection with related PCT Application No. PCT/US2009/065273 on Oct. 14, 2010.

(Continued)

*Primary Examiner* — David J Laux
(74) *Attorney, Agent, or Firm* — GE Global Patent Operation; Stephen G. Midgley (57) ABSTRACT

A fuel head assembly (120) for a pulverized coal nozzle includes removeable back cover (123) that may be removed substantially horizontally to allow access to liners (141,143, 145) inside of the fuel head assembly (120) for servicing. This may be used in places where there access from above the fuel head assembly (120) is restricted. The liners (141, 143,145) are constructed of a wear-resistant material and include curved vanes (131,133) for more evenly distributing pulverized solid fuel particles, and for reducing erosion of the fuel head assembly (120).

20 Claims, 7 Drawing Sheets

(56) References Cited

U.S. PATENT DOCUMENTS

| | | | |
|---|---|---|---|
| 4,611,543 A | 9/1986 | Collette | |
| 4,633,913 A | 1/1987 | Carty et al. | |
| 4,654,001 A | 3/1987 | LaRue | |
| 4,684,155 A * | 8/1987 | Davis | 138/175 |
| 5,205,226 A | 4/1993 | Kitto, Jr. et al. | |
| 5,526,758 A | 6/1996 | Giammaruti et al. | |
| 5,588,380 A | 12/1996 | LaRose | |
| 5,623,884 A * | 4/1997 | Penterson et al. | 110/264 |
| 6,053,118 A | 4/2000 | Okamoto et al. | |
| 6,058,855 A | 5/2000 | Ake et al. | |
| 6,105,516 A | 8/2000 | Bowen | |
| 6,409,790 B1 | 6/2002 | Calderon et al. | |
| 8,561,554 B2 | 10/2013 | Takashima et al. | |
| 8,869,716 B2 | 10/2014 | Takashima et al. | |
| 2003/0104328 A1 | 6/2003 | Kobayashi et al. | |
| 2003/0192339 A1 | 10/2003 | Macbain | |
| 2003/0209470 A1 | 11/2003 | Wark | |
| 2007/0095260 A1 | 5/2007 | John | |
| 2009/0038518 A1 | 2/2009 | Liu et al. | |
| 2010/0123027 A1 | 5/2010 | Larue et al. | |
| 2010/0154689 A1* | 6/2010 | Adam et al. | 110/265 |
| 2010/0192817 A1* | 8/2010 | Shekell | 110/261 |

FOREIGN PATENT DOCUMENTS

| | | |
|---|---|---|
| CN | 101135444 A | 3/2008 |
| CN | 201126192 Y | 10/2008 |
| DE | 573335 C | 3/1933 |
| DE | 10360839 B3 | 6/2005 |
| FR | 748661 A | 7/1933 |
| FR | 1254138 A | 2/1961 |
| JP | S58110908 A | 7/1983 |
| JP | 58164910 A | 9/1983 |
| JP | 58224207 A | 12/1983 |
| JP | 62168463 A | 7/1987 |
| JP | H0174409 U | 5/1989 |
| JP | H01314803 A | 12/1989 |
| JP | H0250011 A | 2/1990 |
| JP | H02100034 U | 8/1990 |
| JP | H08303748 A | 11/1996 |
| JP | H09133345 A | 5/1997 |
| JP | 1019207 A | 1/1998 |
| JP | 11292283 A | 10/1999 |
| JP | 2000320807 A | 11/2000 |
| JP | 2003279006 A | 10/2003 |
| JP | 2009131793 A | 6/2009 |
| JP | 2009162441 A | 7/2009 |
| TW | 1272357 | 2/2007 |
| TW | 1303303 B | 11/2008 |

OTHER PUBLICATIONS

Non-Final Office Action issued in connection with related U.S. Appl. No. 12/504,932 on Aug. 7, 2012.
Unofficial English translation of Office Action and Search Report issued in connection with related TW Application No. 098140411 on Aug. 23, 2012.
Non-Final Office Action issued in connection with related U.S. Appl. No. 12/610,671 on Jan. 16, 2013.
Non-Final Office Action issued in connection with related U.S. Appl. No. 12/504,932 on Jan. 18, 2013.
Unofficial English translation of Office Action issued in connection with related KR Application No. 10-2011-7016290 on Feb. 22, 2013.
Unofficial English translation of Office Action issued in connection with related JP Application No. 2011-542187 on Jun. 11, 2013.
Final Office Action issued in connection with related U.S. Appl. No. 12/504,932 on Jun. 28, 2013.
Unofficial English translation of Notice of Allowance issued in connection with related KR Application No. 10-2011-7016290 on Aug. 26, 2013.
Final Office Action issued in connection with related U.S. Appl. No. 12/610,671 on Oct. 16, 2013.
Final Office Action issued in connection with related U.S. Appl. No. 12/504,932 on Jan. 7, 2014.
Unofficial English translation of Notice of Allowance issued in connection with related JP Application No. 2011-542187 on Jan. 6, 2014.
Unofficial English translation of Notice of Allowance issued in connection with related KR Application No. 10-2013-7016404 on Jan. 24, 2014.
Unofficial English translation of Office Action issued in connection with related MX Application No. MX/a/2011/006410 on Apr. 1, 2014.
Non-Final Office Action issued in connection with related U.S. Appl. No. 12/610,671 on May 19, 2014.
Unofficial English translation of Office Action and Search Report issued in connection with related CN Application No. 200980157306.5 on Jun. 18, 2014.
Unofficial English translation of Office Action issued in connection with related TW Application No. 098140411 on Jul. 2, 2014.
Non-Final Office Action issued in connection with related U.S. Appl. No. 12/504,932 on Aug. 4, 2014.
Unofficial English translation of Office Action issued in connection with related MX Application No. MX/a/2011/006410 on Nov. 28, 2014.
Final Office Action issued in connection with related U.S. Appl. No. 12/610,671 on Dec. 5, 2014.
Unofficial English translation of Office Action issued in connection with related JP Application No. 2014-020213 on Dec. 8, 2014.
Final Office Action issued in connection with related U.S. Appl. No. 12/504,932 on Dec. 9, 2014.
Office Action issued in connection with related CA Application No. 2846986 on Mar. 17, 2015.
Examination Report issued in connection with related AU Application No. 2009336102 on May 5, 2015.
Notice of Allowance issued in connection with related U.S. Appl. No. 12/610,671 on May 22, 2015.
Unofficial English translation of Office Action issued in connection with related TW Application No. 104100804 on May 25, 2015.
Notice of Acceptance issued in connection with related AU Application No. 2009336102 on Oct. 27, 2015.
Unofficial English translation of Notice of Allowance issued in connection with related JP Application No. 2014-020213 on Nov. 24, 2015.

* cited by examiner

Fig. 9

FUEL HEAD ASSEMBLY WITH REPLACEABLE WEAR COMPONENTS

CROSS REFERENCE TO RELATED APPLICATIONS

This application claims priority from U.S. Provisional Patent Application No. 61/585,804 filed Jan. 12, 2012. This application is related to, and incorporates by reference U.S. Non-Provisional patent application Ser. No. 12/610,671, filed Nov. 2, 2009, entitled "COAL ROPE DISTRIBUTOR WITH REPLACEABLE WEAR COMPONENTS", as if set forth in its entirety herein. U.S. application Ser. No. 12/610,671 and the present application are commonly owned.

BACKGROUND

The present invention relates to pulverized solid fuel (powdered coal) delivery systems and, more particularly, to a fuel head assembly for use in a pulverized coal delivery system.

Solid fuel furnaces, such as those used in boilers and steam generators typically burn powdered (pulverized) coal that is entrained in flowing air. The pulverized coal/air is blown into the furnace through coal piping along with additional air to create a swirling fireball. The fireball heats water in pipes encircling the furnace to create steam.

Coal is pulverized in a pulverizer then blown through coal pipes, fuel heads, nozzle and nozzle tip into the furnace.

Since the pulverized coal/air is very abrasive, blowing the pulverized coal through these structures has the same effect as sandblasting. The pulverized coal wears through these elements, damaging them. Damages coal ducting can cause fires and explosions. Therefore, it is important to minimize damage done to the coal ductwork.

Figure 1:
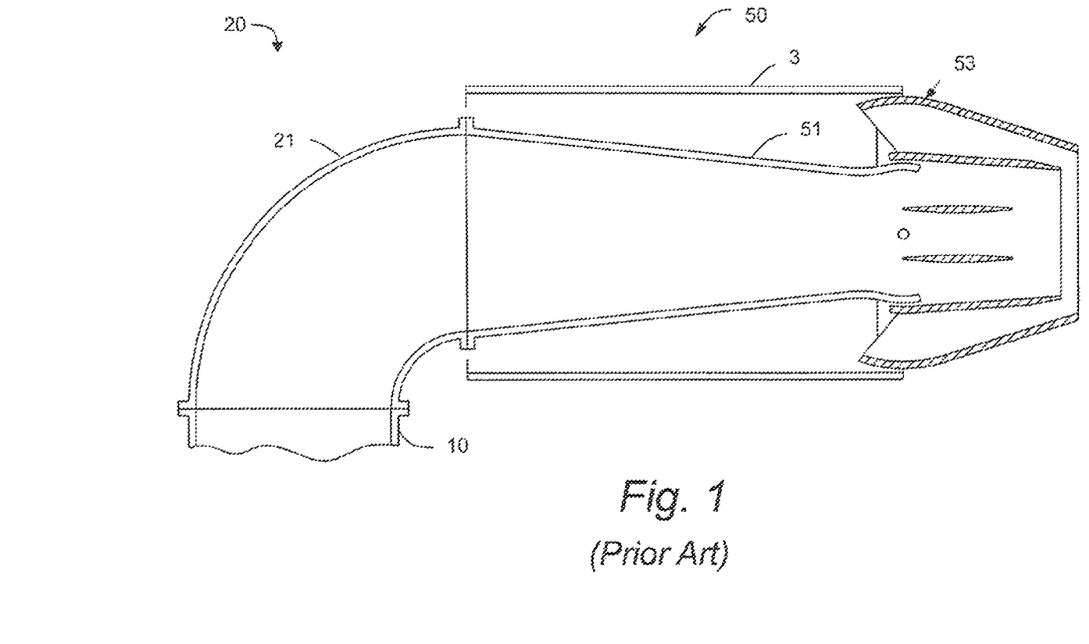
FIG. 1 is a cross-sectional, elevational view of a prior art pulverized coal nozzle assembly including a fuel head assembly.

FIG. 1 depicts a cross-sectional, elevation view of a conventional solid fuel ductwork disposed within a fuel compartment 3 of a solid fuel-fired furnace, such as a boiler or steam generator. While only one fuel compartment 3 is shown, it will be appreciated that many fuel compartments 3 having solid fuel ductwork are typically employed.

The pulverized coal/air stream from a pulverizer is provided by a fuel pipe 10. Fuel pipe 10 is connected to a fuel head assembly 20. This conventional fuel head assembly 20 is simply elbow 21 that redirects the pulverized coal/airstream from a vertical direction to a horizontal direction. The outlet of the fuel head assembly 20 is connected to a nozzle assembly 50.

The nozzle assembly 50 includes a nozzle body 51 that increases the velocity of the coal/air stream and a nozzle tip 53, which protrudes into a combustion chamber of the furnace.

The nozzle tip 53 is designed to pivot to direct the pulverized coal/airstream to a specific location within the furnace.

The pulverized coal particles tend to aggregate at various paths as they pass through the ductwork based upon airflow pressures. These typically resemble ropes extending through the ductwork, and are referred to as 'coal ropes'. The coal ropes amplify the erosion effect and also reduce the burning efficiency in the furnace. Therefore, it is desirable to break up coal ropes and evenly distribute the fuel particles within the airstream.

Figure 2:
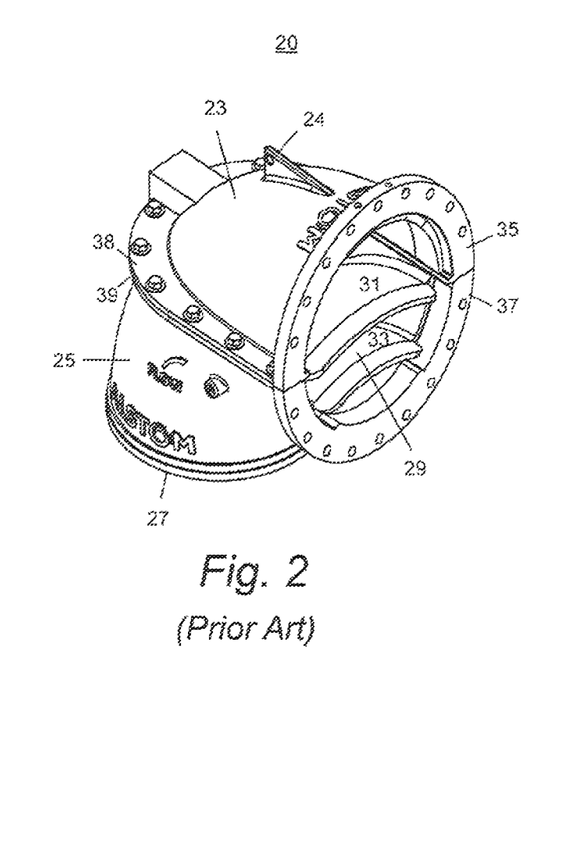
FIG. 2 is a perspective view of a prior art fuel head assembly.
Figure 3:
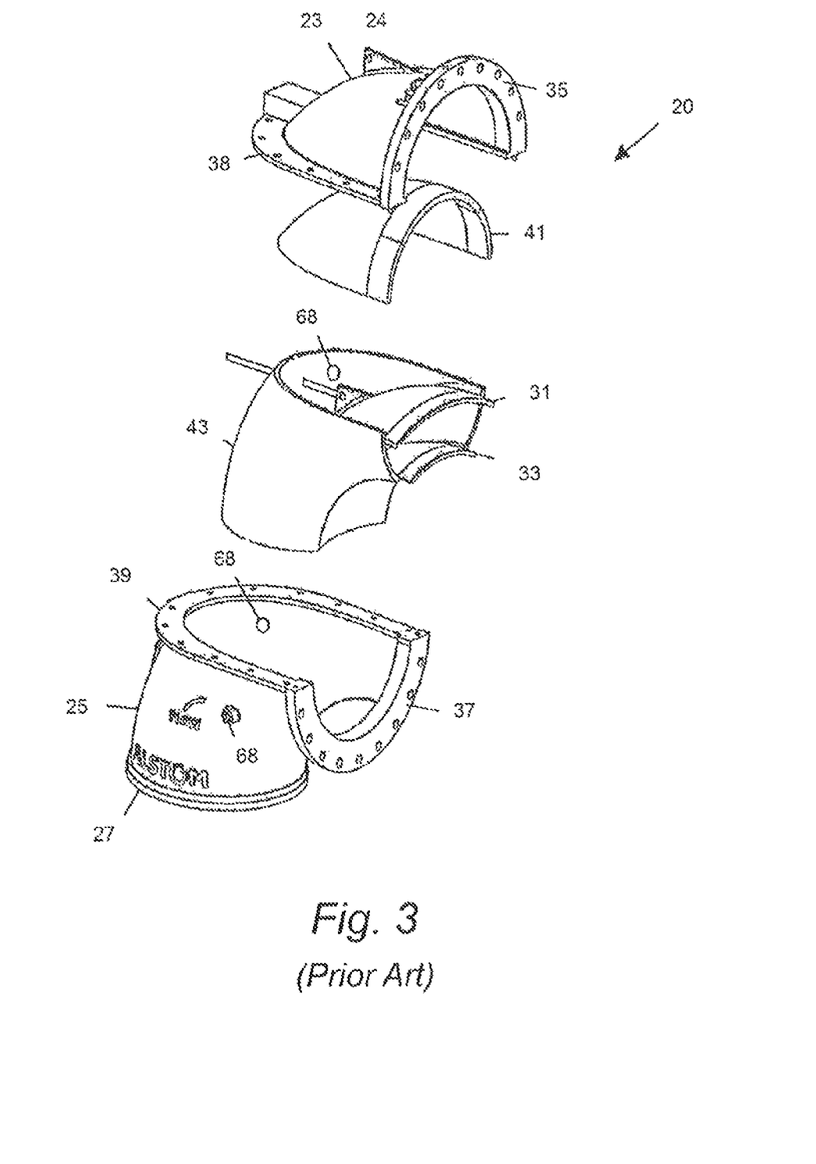
FIG. 3 is an exploded view of the fuel head assembly of FIG. 2 showing its internal structures.

In order to reduce wear, and to reduce the formation of 'coal ropes', the design shown in FIGS. 2 and 3 was implemented.

FIG. 2 is a perspective view of a fuel head assembly 20, previously invented by the Inventors of the present application. The fuel head assembly 20 has an inlet port 27 and an outlet port 29. The fuel/airstream is received at the inlet port 27, passes through the fuel head assembly 20 and out of the outlet port 29. The outlet port 29 has an outlet port upper flange 35 and an outlet port lower flange 37 that are used to connect fuel head assembly 20 to nozzle assembly 50.

A removable cover 23 and lower casing 25 connect to each other to create an internal cavity being a curved tubular conduit fluidically coupling the inlet port 27 to the outlet port 29. Removable cover 23 includes a lifting lug 24, used to lift the removable cover 23.

In FIG. 3, replaceable, wear-resistant cover liner 41, and casing liner 43 are disposed within the internal cavity and shown in an exploded view. As shown here, bolts holding a cover upper flange 38 to a cover lower flange 39 are removed. The removable cover 23, cover liner 41 and casing liner 43 can then be removed in an upward direction. However, in some furnaces/boilers, there are structural members that are immediately above the fuel heads 20 making it difficult and time-consuming, or impossible to remove the removable cover 23, cover liner 41 and casing liner 43. Since power plants are shut down during maintenance, and replacement electricity must be purchased for every minute the power plant is off line, it is financially beneficial to complete the maintenance quickly.

Also, the design shown in FIGS. 2 and 3 has an output port flange that is in two pieces. When the removable cover 23 is removed, only the outlet port lower flange 37 is attached to and supporting the weight of the fuel head assembly 20 and the fuel pipes 10.

An inspection port 68 is provided to allow viewing or testing inside of fuel head assembly 20.

Therefore, currently, there is a need for a fuel head that can be easily serviced in spaces that are confined above the fuel heads, and is designed to provide additional support to the coal pipes when being serviced.

BRIEF SUMMARY

The drawbacks and deficiencies of the prior art are overcome or alleviated by a fuel head assembly for directing pulverized solid fuel entrained in an airstream into a furnace, the fuel head assembly having:

a casing being a generally surrounding a curved central path, the casing having a top, bottom, a left side, a right side, a front side and back side, the casing having an inlet port on its front side, an outlet port on its bottom side, and an elbow opening between the inlet port and the outlet port on its back side;

a back cover adapted to attach to the casing closing the elbow opening and creating tubular conduit fluidically coupling the inlet port to the outlet port;

a casing liner that can be removed through the elbow opening made of wear-resistant material and disposed within the tubular conduit having at least one curved vane curved in a lengthwise direction extending at least partially between the inlet port and the outlet port, for directing the pulverized solid fuel and airstream from the inlet port to the outlet port and away from internal surfaces of the casing.

BRIEF DESCRIPTION OF THE DRAWINGS

Referring now to the drawings wherein like items are numbered alike in the various Figures.

DETAILED DESCRIPTION

Figure 4:
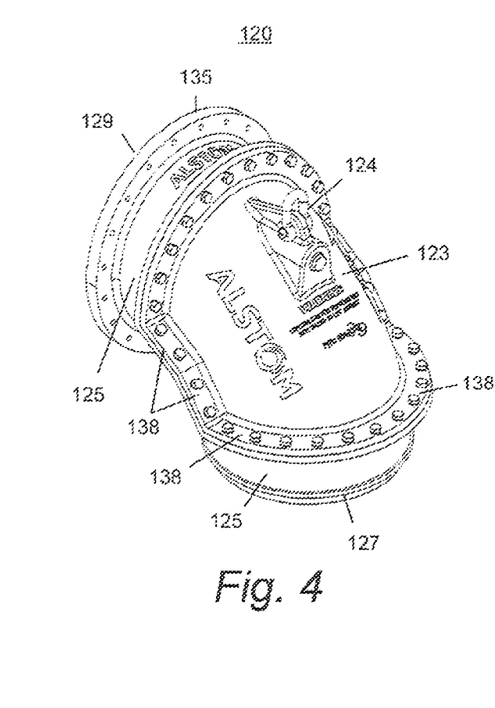
FIG. 4 is a perspective view of the fuel head assembly according to one embodiment of the present invention.
Figure 5:
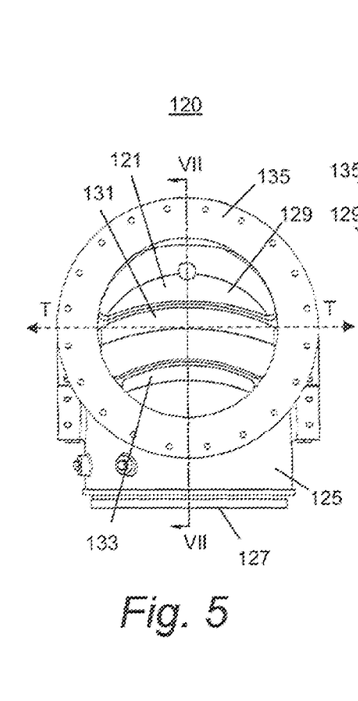
FIG. 5 is an elevational view from the front of the fuel head assembly of FIG. 4 showing an outlet port.
Figure 6:
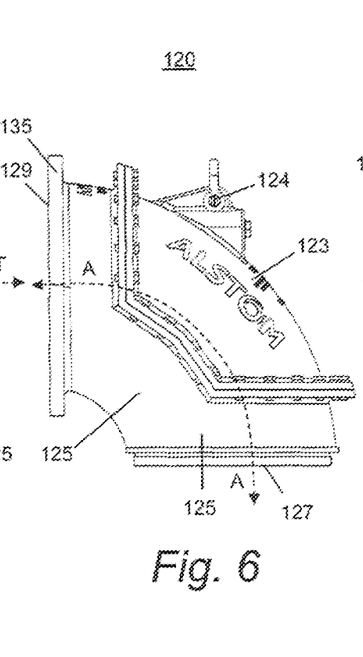
FIG. 6 is a elevational view from the left side of the fuel head assembly of FIGS. 4 and 5.
Figure 8:
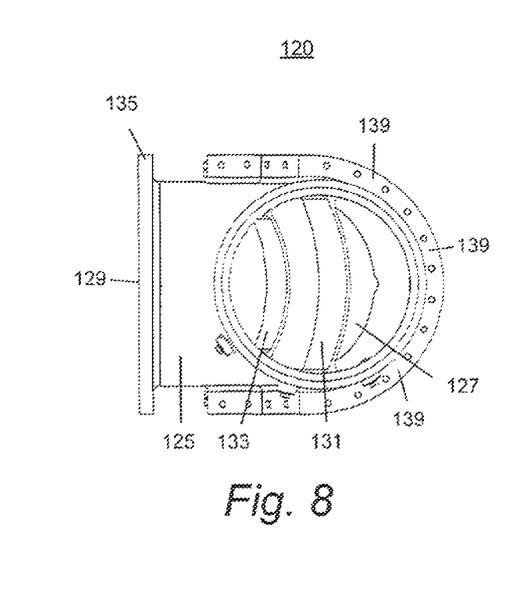
FIG. 8 is a view of the bottom of the fuel head assembly of FIGS. 4-7 showing its inlet port.

FIG. 4 is a perspective view of the fuel head assembly 120 according to one embodiment of the present invention. The fuel head 120 includes an inlet port 127 fluidically connected to an outlet port 129. FIGS. 5, 6 and 8 are various other views of the fuel head assembly 120. Fuel head assembly 120 will be described in connection with FIGS. 4-8 below.

The inlet port 127 connects to the fuel pipes (10 of FIG. 1). The outlet port flange 135 is intended to connect the fuel head assembly 120 to the nozzle assembly (50 of FIG. 1).

With reference to FIG. 5, the front of the fuel head 120 is shown. It employs a casing 125 with a top, bottom, two sides as shown in FIG. 5. An outlet port 129 is in the front of the casing. An inlet port 127 is on the bottom of the casing 125.

Figure 7:
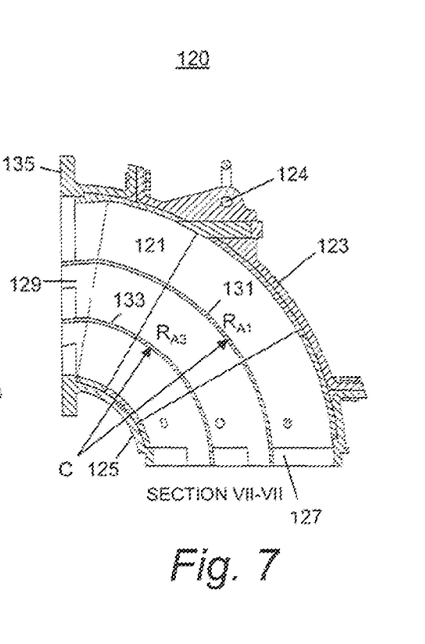
FIG. 7 is a sectional devotional view of the fuel head assembly of FIGS. 4-6 along line VII-VII of FIG. 5.

FIGS. 6 and 7 show a portion of the back of fuel head 120. A back cover 123 closes the back of the casing 125 to create a curved tubular conduit 121 curving around a center point "C", fluidically coupling the inlet port 127 to the outlet port 129. Back cover 123 has a lifting lug 124 used to lift back cover 123.

A dashed line marked "T" in FIG. 5 shows the transverse direction from side to side across the tubular conduit 121. In FIG. 6, a dashed line marked "A" shows an arcuate direction generally following a flow path of the solid fuel particles/airstream through the conduit 121. Moving along this flow path is considered moving in an arcuate direction inside of the tubular conduit 121.

Wear-resistant removable and replaceable casing liners are disposed within the internal cavity of fuel head 120. The liners have a plurality of curved vanes 131, 133 (two are shown in this embodiment, however any number may be used).

FIG. 7 shows the curved vane 131 have a surface that curves in an arcuate direction moving from the inlet port 127 to the outlet port 129 having a radius of curvature $R_{A1}$ for curved vane 131 and $R_{A3}$ for curved vane 133.

The curved vanes 131, 133 are also curved in a sideways (side to side) direction. The two curved vanes 131, 133 of this embodiment both have the same transverse radius of curvature ($R_T$ of FIG. 14). The curvature both lengthwise and sideways are selected to direct the solid fuel particles away from the walls of the fuel head 120 and the nozzle body (51 of FIG. 1). By having the curved vanes pass through the center of the fuel head 120, solid fuel particles are more evenly dispersed and do not concentrate to cause increased erosion at various locations inside of casing 125.

This curvature in two dimensions is effective at directing the stream of air and pulverized fuel particles from the inlet port 127 toward the outlet port 129 away from internal surfaces. This greatly reduces wear and erosion of the fuel head 120 and coal nozzle, and reduces required maintenance.

The curved vanes 131, 133 function to guide the air/fuel particles through the head assembly 120 but also function to break up coal ropes. These generally direct the fuel particles entrained in air flow around from the inlet port 127 to the outlet port 129 reducing collection of a coal ropes typically having the largest possible radius of curvature that typically runs along the inside surface of the head assembly 120. These direct a portion of the flow underneath each of the curved vanes 131, 133 instead of concentrating the flow of solid fuel particles on the inner surface of the casing 125.

In the preferred embodiment, the curved vanes 131, 133 are fixed and do not move relative to casing 125. This design provides additional strength and minimizes unwanted movement and or adjustment of curved vanes 131, 133. They are shaped to more evenly distribute the coal particles and break up coal ropes. However, in another embodiment, it may be possible to rotationally offset the curved vanes a small amount around the circumference of the tubular conduit to counteract swirling effects of the solid fuel particles and airstream.

Figure 9:
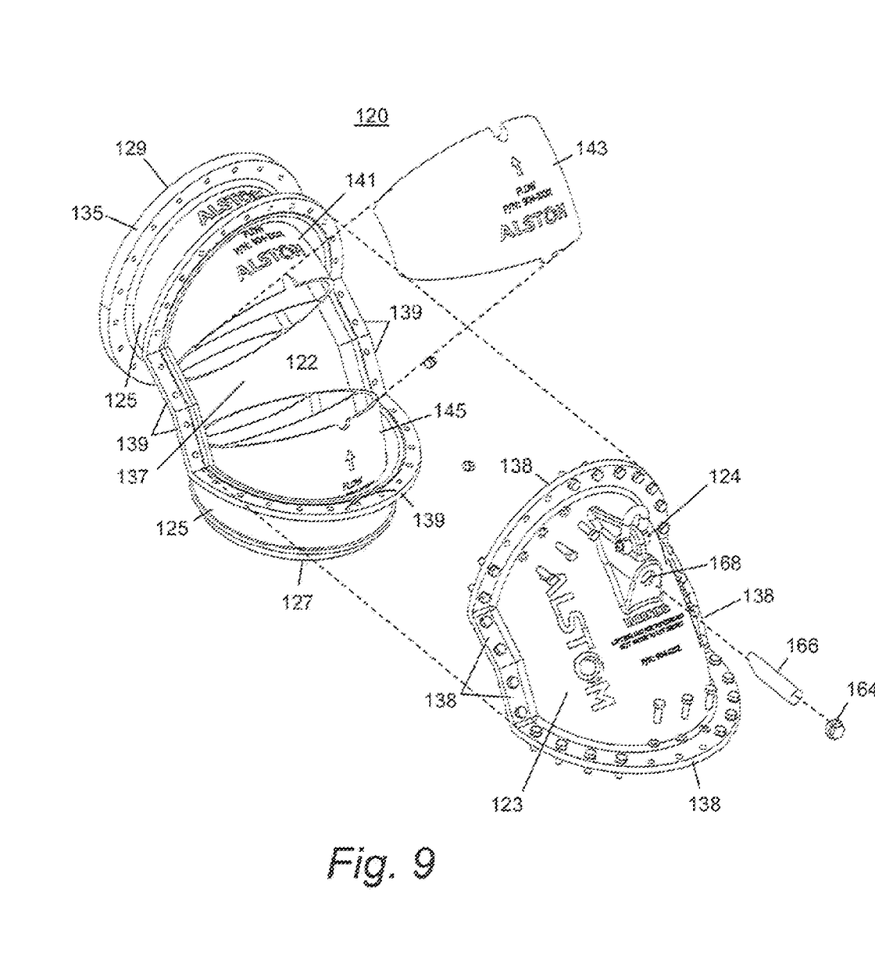
FIG. 9 is an exploded perspective view of the fuel head assembly of FIG. 4 showing its internal structures.
Figure 10:
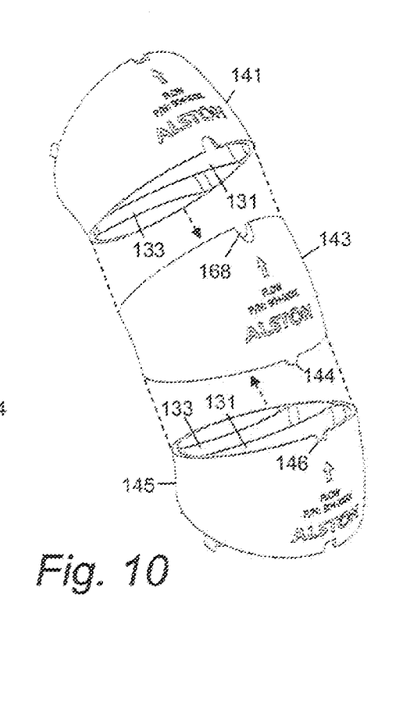
FIG. 10 is an exploded perspective view of the internal liners according to one embodiment of the present invention.

FIG. 9 is an exploded view of the fuel head assembly of FIG. 4 showing an elbow opening 137 and internal structures. The internal structures are also visible and will be described with respect to FIGS. 9-13. The elbow opening 137 has to be large enough to allow the removal and installation of the liner 141, 143, 145. This may require the elbow opening 137 to extend substantially from the left side to the right side of the casing 125 as shown in FIG. 9.

Back cover 123 is removed by removing the bolts in cover flange 138 and casing flange 139 to open elbow opening 137 and to expose a wear-resistant upper liner 141, middle liner 143 and a lower liner 145. Middle liner 143 is designed to be wedge shaped so that it can be removed first, and inserted last. The upper liner 141 and lower liner 145 are removed after the middle liner 143, and during installation, are inserted before the middle liner 143. All may be removed/inserted without the requirement that they be removed/inserted in a vertical direction. This allows the present invention to be used where there is limited space above the fuel head assembly 120.

During replacement of the internal liner 141, 143, 145, the outlet port flange 135 does not need to be disconnected from the nozzle assembly (50 of FIG. 1). Therefore, the full outlet flange retains all of its strength, unlike the prior art device. Outlet port flange 135 can support the weight of the fuel head assembly 120 and the attached fuel pipes 10 during servicing without the need for additional support. This is an advantage of the present invention over prior art designs.

It can now be seen that once the back cover 123 has been removed, the internal parts are easily accessible and replaceable through the elbow opening 137.

One or more inspection ports 168 may be located in the fuel head assembly 120 passing through the back cover 123, the liner 143 to allow inspection/testing of the fuel flow or internal surfaces. A liner plug 166 and a port cap 164 seal the inspection port 168 when it is not in use.

For reassembly, the cover flange 138 of the back cover 123 and the casing flange 139 of the casing 125 are bolted together to sandwich a gasket (preferably made of tetrafluoroethylene) for a positive seal. Therefore, the present invention provides a device for breaking coal ropes that has removable wear parts, is easily accessible and less costly to maintain.

FIGS. 10-13 are exploded views of the fuel head assembly showing the internal liners.

An upper liner 141 fits into casing 125 near the outlet port 129. A lower liner 145 fits into casing 125 near the inlet port 127. The middle liner 143 fits snugly between the upper liner 141 and the lower liner 145. At least one tab 144 may be attached to a liner to fit into a notch 146 to properly align the liners and hold them in place. Similar tabs and notches may be added to the upper liner 141 and casing 125 and to liner 145 and casing 125 to cause proper alignment of these liners.

The liners 141, 143, 145 each include portions of the curved vanes 131, 133. The liners are designed such that when properly assembled, create continuous curved vanes. In this embodiment, the three liners 141, 143, 145 fit together to create two continuous curved vanes 131 and 133.

The casing liner according to the present invention is designed to be much easier to install since the back cover 123 and the liners 141, 143 and 145 can be removed in a substantially horizontal direction, as opposed to the prior art devices, which required the cover and liners to be removed in a vertical direction. As indicated above, sometimes there are structures located immediately above the nozzle heads that prevent removal of parts in a vertical direction.

In this embodiment, the curvature of curved vanes 131, 133 is coaxial with the curvature of the tubular conduit 121. This effectively splits up the flow into sections above, below and between the vanes to direct flow around the curve to break up coal ropes and even the distribution of the airflow and entrained solid fuel particles through the fuel head assembly 120.

Figure 11:
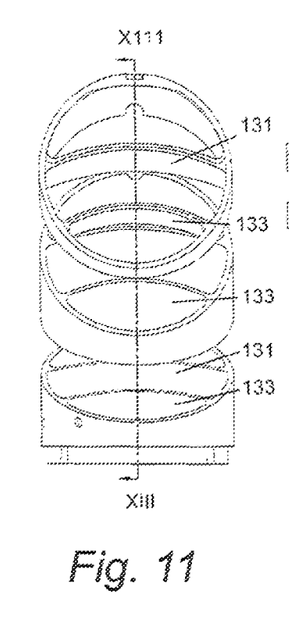
FIG. 11 is an exploded perspective view of the internal liners according to the present invention.
Figure 12:
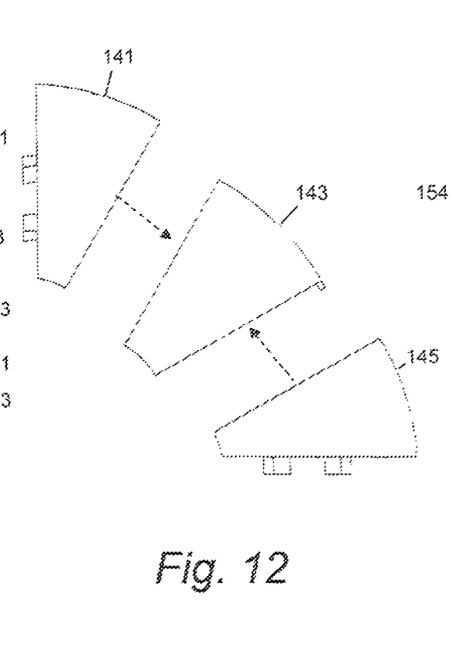
FIG. 12 is a side elevational exploded view of the internal liners according to the present invention.
Figure 13:
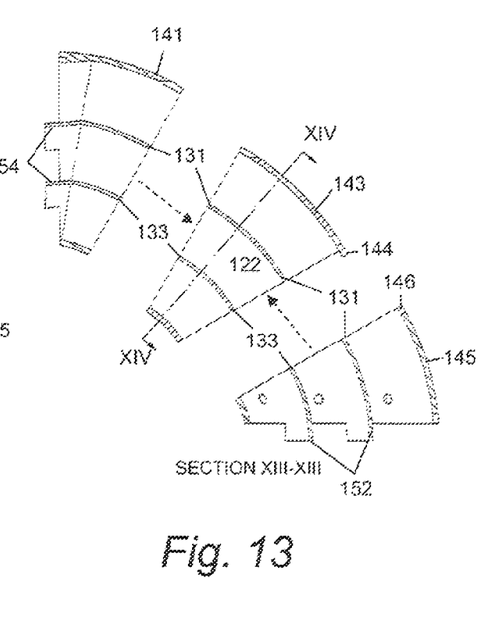
FIG. 13 is a cross sectional view of the liners along line XIII-XIII of FIG. 11.

FIG. 13 is a cross sectional view through lines B-B of FIG. 11 shoving the lengthwise curvature of the curved vanes 131, 133.

Preferably, the leading edge 152 is substantially parallel to its nearest surface enclosing the tubular conduit 122. This reduces air resistance and pressure drop.

Also, preferably, the trailing edge 154 of at least one of the curved vanes 131, 133 is angled downward away from the inner surface of the top of liner 141. This angle is preferably up to 13 degrees. This further reduces the air stream with entrained pulverized coal from contacting surfaces of the fuel head assembly 120 and/or the nozzle assembly 150.

Figure 14:
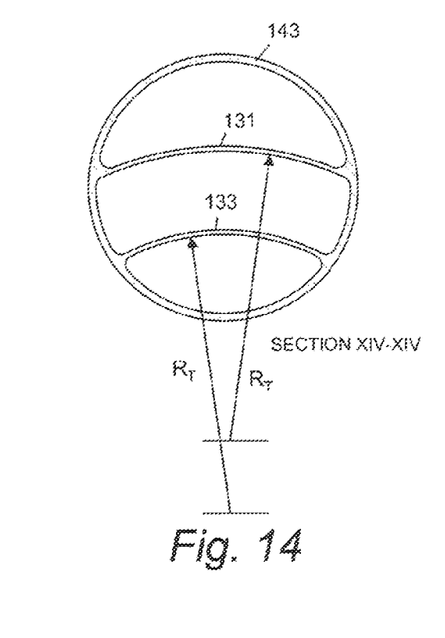
FIG. 14 is a cross sectional view of the middle liner along line XIV-XIV of FIG. 13.

FIG. 14 is a cross sectional view through line XIV-XIV of FIG. 13, and adjusted to make line XIV-XIV vertical. Here the shape of the curved vanes 131, 133 can be seen. Both curved vanes have the same radius of curvature ($R_T$) in a transverse direction.

In the preferred embodiment, the curved vanes 131, 133 are fixed and do not move relative to casing 125. This design provides additional strength and minimizes unwanted movement and or adjustment of curved vanes 131, 133. They are shaped to more evenly distribute the flow of coal particles and break up coal ropes.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Since the invention is susceptible to various modifications and alternative forms, it should be understood that the invention is not intended to be limited to the particular forms disclosed. Rather, the scope of the invention extends to all modifications, equivalents and alternatives falling within the spirit and scope of the invention as defined by the appended claims.

What is claimed is:

1. A fuel head assembly for directing pulverized solid fuel entrained in a gas stream into a furnace, the fuel head assembly comprising:
    a casing having an inlet port flange at one end of the casing, an outlet port flange at another end of the casing, and an elbow opening disposed in an outer radial portion of the casing, wherein the elbow opening extends between the inlet port flange and the outlet port flange, and wherein the casing includes an outwardly extending casing flange disposed about the elbow opening;
    a curved back cover including an outwardly extending cover flange in parallel contact with and removably attachable to the outwardly extending casing flange to form an arcuate conduit having an inner wall;
    a wear-resistant casing liner being tubular and disposed within the arcuate conduit to form a tubular inner wall extending circumferentially about the inner wall of the conduit and fluidly coupling the inlet port flange and the outlet port flange, the wear-resistant casing liner including an upper casing liner section, a middle casing liner section and a lower casing liner section being insertable into and replaceable through the elbow opening of the casing,
    wherein each of the upper casing liner section, the middle casing liner section and the lower casing liner section includes at least one of a tab and a complementary notch to interconnect the upper casing liner section, the middle casing liner section and the middle casing liner section together.

2. The fuel head assembly of claim 1, wherein the middle casing liner section snugly fits between the upper casing liner section and the lower casing liner section.

3. A fuel head assembly for directing pulverized solid fuel entrained in a gas stream into a furnace, the fuel head assembly comprising:
    an elbow-shaped casing having an inlet port flange at one end of the casing, an outlet port flange at another end of the casing, and an elbow opening disposed in an outer radial portion of the casing, wherein the elbow opening extends between and spaced from the inlet port flange and the outlet port flange;
    a curved back cover including an outwardly extending cover flange in contact with and removably attachable to the outwardly extending casing flange to form an arcuate conduit having an inner wall; and
    a tubular wear-resistant casing liner disposed within the arcuate conduit to form a tubular inner wall extending circumferentially about the inner wall of the conduit and fluidly coupling the inlet port flange and the outlet port flange, the wear-resistant casing liner comprising an upper casing liner section, a lower casing liner section, and a middle casing liner section, wherein each of the upper casing liner section, the middle casing liner section and the lower casing liner section comprises at least one of a tab and a complementary notch to interconnect the upper casing liner section, the middle casing liner section and the middle casing liner section together.

4. The fuel head assembly of claim 3, wherein the upper casing liner, the lower casing liner, and the middle casing liner are each configured to be partially exposed in the elbow opening and removable when the curved back cover is removed.

5. The fuel head assembly of claim 4, wherein the wear-resistant liner includes at least one vane disposed therein extending at least partially between the inlet port and the outlet port and within each of the upper casing liner section, the middle casing liner section and the lower casing liner.

6. The fuel head assembly of claim 4, further comprising:

an aperture passing through the casing and the wear-resistant casing liner into the conduit to allow inspection of surfaces inside the wear-resistant casing liner.

7. The fuel head assembly of claim 4, wherein the middle casing liner section is wedge-shaped.

8. The fuel head assembly of claim 7, wherein the upper and lower casing liner sections are shaped such that the meeting of the upper and lower casing liner sections and the middle casing liner section is flush.

9. The fuel head assembly of claim 4, wherein the upper casing liner section, the middle casing liner section and the lower casing liner section are interconnected.

10. The fuel head assembly of claim 9 wherein each of the upper casing liner section, the middle casing liner section and the lower casing liner section includes at least one of a tab and a complementary notch to interconnect the upper casing liner section, the middle casing liner section and the middle casing liner section together.

11. The fuel head assembly of claim 10, wherein middle casing liner section snugly fits between the upper casing liner section and the lower casing liner section.

12. The fuel head assembly of claim 4, wherein the wear-resistant liner includes at least one vane disposed therein extending at least partially between the inlet port flange and the outlet port flange.

13. The fuel head assembly of claim 12, wherein the vane is further curved in another plane that passes through the arcuate conduit and having a transverse radius of curvature.

14. The fuel head assembly of claim 13, wherein the transverse radius of curvature of vane is approximately equal to that of the conduit.

15. The fuel head assembly of claim 12, wherein the vane includes at least two vanes, which are concentric in an arcuate direction.

16. The fuel head assembly of claim 12, wherein the vane has a trailing edge angled downward between 0 to 13 degrees relative to an adjacent inner surface of the wear-resistant casing liner.

17. The fuel head assembly of claim 12, wherein the vane comprises a leading edge substantially parallel to an adjacent inner surface of the wear-resistant casing liner.

18. The fuel head assembly of claim 12, wherein the vane is fixed with respect to the casing to provide additional strength and minimize unwanted movement of the vane.

19. The fuel head assembly of claim 4, wherein the wear-resistant liner having an outer surface that abuts an inner surface of the conduit.

20. The fuel head assembly of claim 4, wherein an outer diameter of the wear-resistant liner is substantially the same as an inner diameter of the conduit.

* * * * *